(12) United States Patent
Choi

(10) Patent No.: US 12,509,250 B2
(45) Date of Patent: Dec. 30, 2025

(54) METHOD OF SATELLITE PRECISE ORBIT DETERMINATION USING PARALLACTIC REFRACTION SCALE FACTOR ESTIMATION

(71) Applicant: KOREA ASTRONOMY AND SPACE SCIENCE INSTITUTE, Daejeon (KR)

(72) Inventor: Eun Jung Choi, Daejeon (KR)

(73) Assignee: Korea Astronomy and Space Science Institute, Daejeon (KR)

( * ) Notice: Subject to any disclaimer, the term of this patent is extended or adjusted under 35 U.S.C. 154(b) by 265 days.

(21) Appl. No.: 18/350,862

(22) Filed: Jul. 12, 2023

(65) Prior Publication Data

US 2023/0365276 A1 Nov. 16, 2023

Related U.S. Application Data

(63) Continuation-in-part of application No. 17/245,390, filed on Apr. 30, 2021, now abandoned.

(30) Foreign Application Priority Data

May 13, 2020 (KR) ......................... 10-2020-0056809

(51) Int. Cl.
  *B64G 1/24* (2006.01)
  *B64G 3/00* (2006.01)
  *G01C 21/24* (2006.01)
(52) U.S. Cl.
  CPC ............... *B64G 1/242* (2013.01); *B64G 3/00* (2013.01); *G01C 21/24* (2013.01)

(58) Field of Classification Search
  CPC ........... B64G 1/242; B64G 3/00; G01C 21/24
  See application file for complete search history.

(56) References Cited

U.S. PATENT DOCUMENTS 5,158,249 A * 10/1992 Uphoff ................. B64G 1/2427
                                                              244/158.6
6,085,128 A * 7/2000 Middour ................ B64G 1/244
                                                              701/13

(Continued)

OTHER PUBLICATIONS

Francis J. Lerch et al. "Effect of Parallactic Refraction Correction On Station Height Determination", Goddard Space Flight Center, 1973. 01.

*Primary Examiner* — Scott A Browne
*Assistant Examiner* — Terry C Buse
(74) *Attorney, Agent, or Firm* — You & IP, LLC

(57) ABSTRACT

A method of determining a precise orbit of a satellite through estimation of a parallactic refraction scale factor is proposed, the method includes inputting an initial estimate including initial orbit information of a satellite with respect to an observation epoch and the parallactic refraction scale factor; performing orbit propagation using a high-precision orbit propagator by applying a dynamics model; performing observer-centered satellite optical observation modeling including the parallactic refraction scale factor; calculating an observation residual between actual optical observation data and observation data calculated via the observation modeling reflecting the parallactic refraction; and precisely determining the orbit of the satellite by estimating the parallactic refraction scale factor and a satellite state vector using a batch least square estimation algorithm.

7 Claims, 4 Drawing Sheets

(56) References Cited

U.S. PATENT DOCUMENTS

| | | |
|---|---|---|
| 7,744,036 B2 | 6/2010 | Kawaguchi et al. |
| 11,165,467 B1 * | 11/2021 | Garon ................ H04B 7/18513 |
| 2011/0196550 A1 * | 8/2011 | Carrico, Jr. ............. B64G 3/00 |
| | | 701/13 |
| 2013/0006449 A1 * | 1/2013 | Hindman ............... B64G 1/361 |
| | | 701/13 |
| 2017/0358103 A1 | 12/2017 | Shao et al. |
| 2020/0024012 A1 * | 1/2020 | Fortezza ................ G01S 19/28 |
| 2020/0116852 A1 | 4/2020 | Vazquez et al. |

\* cited by examiner

METHOD OF SATELLITE PRECISE ORBIT DETERMINATION USING PARALLACTIC REFRACTION SCALE FACTOR ESTIMATION

CROSS REFERENCE TO RELATED APPLICATION

This application is a continuation-in-part application of co-pending U.S. application Ser. No. 17/245,390, filed Apr. 30, 2021, the disclosure of which is incorporated herein by reference. The present application claims priority to Korean Patent Application No. 10-2020-0056809, filed May 13, 2020, the entire contents of which is incorporated herein for all purposes by this reference.

FIELD

The disclosure relates to a method of precisely determining the orbit of a satellite in the field of space situational Awareness (SSA) and, more particularly, to a method of precisely determining the orbit of a satellite by simultaneously estimating the satellite position and velocity vector and a parallactic refraction scale factor.

BACKGROUND

As of November 2019, nearly 20,000 artificial space objects including satellites, are orbiting above the earth, and the number of satellites is continuously increasing due to continuous space development. As a result, a risk of an artificial satellite falling to the ground or a risk of a collision between an artificial satellite and space debris is increasing. Accordingly, it is necessary to develop a technology for tracking and monitoring the artificial space objects that can damage Korea space assets or threaten social safety and national security.

The optical surveillance method, which is typically used for tracking and monitoring the artificial space objects, is a method sunlight reflected off of determining the orbit by taking satellites, in a similar way to astronomical observation.

In order to determine the orbit of the satellite using an optical observation system, it is necessary for an observation model to improve the accuracy of estimation obtained from observation errors that best reflect actual observations. The optical observation data converts an image coordinate into a celestial coordinate using a star catalog, in such a manner as to extract the position coordinate of the satellite on the basis of stars in an image observed. In addition to commercial software such as the Orbit Determination Tool Kit (ODTK) of AGI, most satellite orbit take determination software programs into consideration only a light travel time and an aberration phenomenon, as a general optical observation model.

In other words, the satellite optical observation in the related art calculates the right ascension and declination of the satellite, on the basis of the right ascension and declination of a star in an image taken in a snapshot. In this process, since the observed refractive index of the satellite is corrected assuming that the observed refractive index of the satellite located close to the earth is the same as the refractive index of light of a star in the distance, excessive refraction correction is performed, which results in errors appearing as parallactic refraction effects.

Therefore, the optical observation model in the related art does not take into account the parallactic refraction effect, and thus has a problem of inferior precision when applied to satellite orbit determination.

SUMMARY

Accordingly, the disclosed embodiments address the above problems occurring in the related art, and an objective of the disclosure is to provide a method of satellite precise orbit determination, the method being configured to be capable of precisely determining an orbit of a satellite by estimating and correcting the scale factor for reflecting the parallactic refraction effect in the satellite optical observation model, simultaneously with the satellite position and velocity vector.

In order to achieve the above objective, a method of satellite precise orbit determination using parallactic refraction scale factor estimation includes inputting an initial estimate including initial orbit information of a satellite with respect to an observation epoch and the parallactic refraction scale factor; performing orbit propagation using a high-precision orbit propagator by applying a dynamics model; performing observer-centered satellite optical observation modeling including the parallactic refraction scale factor; calculating an observation residual between actual optical observation data and observation data calculated via the observation modeling reflecting the parallactic refraction; and precisely determining the orbit of the satellite by estimating the parallactic refraction scale factor and a satellite state vector using a batch least square estimation algorithm.

The inputting of the initial estimate may include inputting initial estimation parameters for the satellite including an epoch, position, velocity, and inputting an initial value of the parallactic refraction scale factor.

The initial value of the parallactic refraction scale factor may be an initial ratio value of an arbitrary constant.

The initial orbit information of the satellite may be used as an osculating orbital element with the orbit being determined or a mean orbital element (two-line element (TLE)), in which the mean orbital element is used after conversion to the osculating orbital element.

The applying of the dynamics model may include performing orbit integration by applying the high-precision orbit propagator in Cowell's method of numerical integration that reflects a dynamics model.

In the satellite optical observation modeling in the performing of the observer-centered satellite optical observation modeling, a right ascension and a declination may be calculated, in which the parallactic refraction is applied to corrected values of an observer-centered right ascension and declination and a scale factor for estimating the parallactic refraction is included.

The actual optical observation data in the calculating of the observation residual may be observation data of the observer-centered right ascension and declination values of the satellite, which are extracted on the basis of an observation epoch and the right ascension and declination of a star in an image.

The determining of the orbit of the satellite may include estimating the parallactic refraction scale factor and the satellite position and velocity state vector simultaneously in such a manner as to minimize a residual between the actual observation data and the calculated observation value using a batch least square estimation algorithm, and terminating iterative calculations when a convergence condition is satisfied by using a root mean square calculated through the iterative calculations, thereby precisely determining the orbit of the satellite.

According to disclosed embodiments, it is possible to precisely determine an orbit of a satellite by estimating and correcting the scale factor for reflecting the parallactic refraction effect in the satellite optical observation model, simultaneously with the satellite position and velocity vector.

BRIEF DESCRIPTION OF THE DRAWINGS

The above and other objectives, features, and other advantages will be more clearly understood from the following detailed description when taken in conjunction with the accompanying drawings, in which.

DETAILED DESCRIPTION

Figure 1:
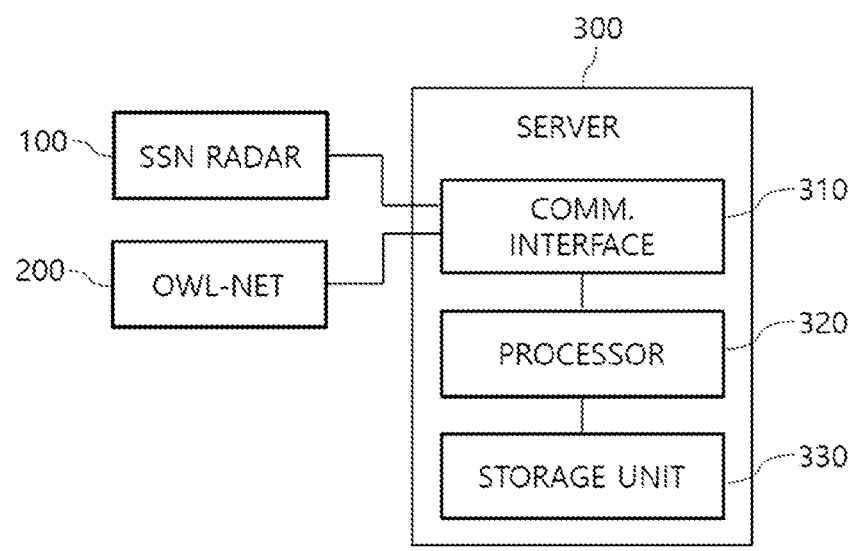
FIG. 1 is a block diagram showing a system of satellite precise orbit determination according to an embodiment.

Hereinafter, embodiments will be described in detail with reference to the accompanying drawings. However, the scope of the rights is not limited by these embodiments. The same reference numerals in each drawing indicate the same members. The terms used in the description below have been selected as general and universal in the related technology field, but there may be other terms depending on the development and/or change of technology, customs, preferences of technicians, and the like. Therefore, terms used in the following description should not be understood as limiting the technical idea, but should be understood as exemplary terms for describing embodiments.

In addition, in certain cases, there are terms arbitrarily selected by the applicant, and in this case, detailed meanings will be described in the corresponding description. Therefore, terms used in the following description should be understood on the basis of meaning of the term and contents throughout the specification, not just the name of the term.

Hereinafter, a system and method of satellite precise orbit determination using parallactic refraction scale factor estimation according to disclosed embodiments will be described.

FIG. 1 is a block diagram illustrating a system for satellite precise orbit determination according to an embodiment.

Referring to FIGS. 1, a system for satellite precise orbit determination may include a space surveillance network (SSN) radar 100 which detects, tracks, catalogs and identifies artificial space objects orbiting Earth, e.g. active/inactive satellites, spent rocket bodies, or fragmentation debris; an optical wide-field patrol network (OWL-Net) 200 which gets orbital information using purely optical means; and a server 300.

The SSN radar 100 and the OWL-Net 200 may obtain orbit information by observing the satellite. Here, the orbit information of the satellite may be two-line elements (TLE) observed by the SSN radar 100, or osculating elements observed by the OWL-Net 200.

The server 300 may include a communication interface 310 to communicate with the SSN radar 100 and the OWL-Net 200 for receiving the orbit information of a satellite, wherein the communication interface 310 may be a software or hardware interface; the processor 320 for precise determination of satellite orbit by using the orbit information received through the communication interface 310, wherein the processor 320 may be a hardware processor and/or software processor; and the storage unit 330 for storing various information, data, programs, etc. related to the operation of the satellite precision orbit determination system, wherein the storage unit 330 is a non-transitory storage medium.

Figure 2:
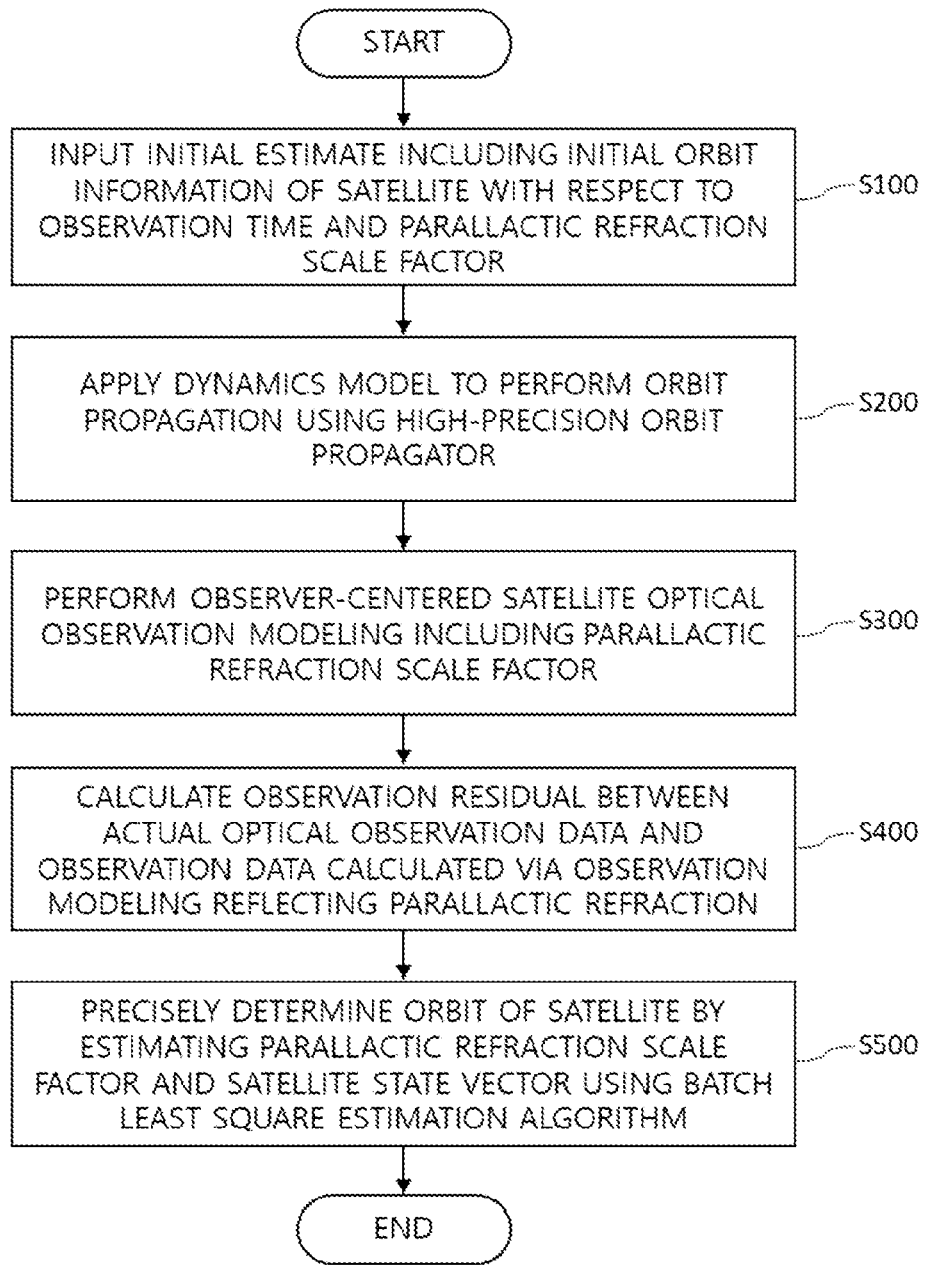
FIG. 2 is a flowchart showing a method of satellite precise orbit determination using parallactic refraction scale factor estimation according to an embodiment.

FIG. 2 is a flowchart illustrating a method of satellite precise orbit determination using parallactic refraction scale factor estimation according to an embodiment.

Referring to FIG. 2, a method of satellite precise orbit determination using parallactic refraction scale factor estimation is configured to include inputting an initial estimate including initial orbit information of the satellite with respect to the observation time and a parallactic refraction scale factor (S100), performing orbit propagation using a high-precision orbit propagator by applying a dynamics model (S200), performing observer-centered satellite optical observation modeling including the parallactic refraction scale factor (S300), calculating an observation residual between the actual optical observation data and observation data calculated via the observation modeling reflecting the parallactic refraction (S400), and precisely determining the orbit of the satellite by simultaneously estimating the parallactic refraction scale factor and the satellite state vector using a batch least square estimation algorithm (S500).

Here, the high-precision orbit propagator is an algorithm that obtains the position and velocity of an artificial space object at an arbitrary time, considering all perturbations that affect the artificial space object, such as the earth's gravitational field, atmospheric drag, the sun and moon gravity, and solar radiation pressure.

The method of satellite precise orbit determination using parallactic refraction scale factor estimation according to the disclosed embodiments will be described in more detail.

First, an initial estimation parameter including initial orbit information of a satellite with respect to the observation epoch using osculating elements observed by OWL-Net or two-line elements (TLE) observed by SSN radar 100, and a parallactic refraction scale factor are input to the server (S100).

Here, both of the initial orbit information of the satellite and the parallactic refraction scale factor may be used as estimation parameters. That is, data representing initial estimation parameters for the satellite including an epoch, position, and velocity may be input, and an initial value of the parallactic refraction scale factor may be input. Herein, an initial ratio value of an arbitrary constant may be applied to the initial value of the parallactic refraction scale factor.

Meanwhile, the position and velocity data, which is the orbit information of the satellite, may be an osculating orbital element generated through orbit determination processing using previous epoch observation data, or may be a mean orbital element (two-line element (TLE)). Here, the mean orbital element may be used after conversion to the osculating orbital element.

Next, orbit propagation is performed using a high-precision orbit propagator that applies a dynamics model (S200).

That is, orbit integration is performed by applying the high-precision orbit propagator in Cowell's method of numerical integration that reflects a dynamics model, thereby calculating the satellite position and velocity for the next epoch.

Here, the dynamics model may accurately model perturbation due to the earth's gravitational potential, perturbation due to the sun and moon gravity, perturbation due to solar radiation pressure, perturbation due to the earth's atmospheric density, and the like.

Next, satellite optical observation modeling centered on the observer, which is associated with a parallactic refraction scale factor, is performed (S300). Herein, the observation modeling is performed in such a manner as to convert the state vector obtained from the dynamics model into observation data. The right ascension and declination of the satellite are calculated on the basis of the right ascension and declination of a star in an image taken as an observation snapshot, due to the nature of optical observation. Herein, in the right ascension and declination values of the satellite provided from the observation data, the distance difference between the satellite and the star is not corrected. Therefore, according to the disclosed embodiments, in the case of objects close to the earth, such as satellites, an over-corrected value through correction using refraction for the star is adjusted so that the observation direction points to the satellite.

Since the satellite optical observation is given in terms of right ascension and declination values, the parallactic refraction correction used for analysis as a modeling error is as follows.

The ceiling Z of the satellite is $Z=Z_0-\Delta R$, and the parallactic refraction used for modeling correction is $\Delta R=2.1 \tan Z/\rho \cos Z$ (radians). Here, $\rho$ indicates the distance (m) between the station and the satellite.

Accordingly, the right ascension $\alpha$ and declination $\delta$ obtained from the optical observation data may consist of a sum of corrections according to observation modeling as shown in Equation 1. That is, the calculation is performed by applying the parallactic refraction to corrected values of the right ascension and declination centered on the observer, and including the scale factor for estimating the same.

$$t = t_0 + \varepsilon_{LT}, \qquad [\text{Equation 1}]$$

$$\alpha = \alpha_0 + \varepsilon_{Aaberr\_RA} + \varepsilon_{Daberr\_RA} + \Delta t \cdot \dot{\alpha} + K \cdot \Delta R \frac{\sin q}{\cos \delta_0},$$

$$\delta = \delta_0 + \varepsilon_{Aaberr\_DEC} + \varepsilon_{Daberr\_DEC} + \Delta t \cdot \dot{\delta} + K \cdot \Delta R \cos q,$$

Where, t denotes an observation epoch; $\varepsilon_{LT}$ denotes a light time delay; $\alpha_0$ and $\delta_0$ denote right ascension and declination in the J2000 coordinate system, respectively; $\varepsilon_{Aaberr\_RA}$ and $\varepsilon_{Daberr\_RA}$ denote corrections of annual aberration and diurnal aberration for the right ascension, respectively; $\varepsilon_{Aaberr\_DES}$ and $\varepsilon_{Daberr\_DEC}$ denote corrections of annual aberration and diurnal aberration for the declination, respectively; $\Delta t$ denotes a time bias correction value; $\dot{\alpha}$ and $\dot{\delta}$ denote a ratio of right ascension to declination; $\Delta R$ denotes parallactic refraction; q denotes a parallactic angle; and $K(K=15.35*P/460+T)$ denotes a parallactic refraction scale factor.

Herein, a value of K is a parameter affected by temperature (T, °C.) and pressure (P, inchHg) and estimated in the disclosed embodiment.

Next, an observation residual between actual optical observation data obtained through the actual optical observation and data calculated by observation modeling reflecting the parallactic refraction is calculated (S400). Here, the actual optical observation data may be observation data of an observer-centered right ascension and declination value of the satellite, which is extracted on the basis of the observation epoch and the right ascension and declination of the star in the image.

Next, the parallactic refraction scale factor and a satellite state vector are simultaneously estimated using a batch least square estimation algorithm, thereby precisely determining the orbit of the satellite (S500). In other words, the parallactic refraction scale factor and the satellite position and velocity state vector are simultaneously estimated in such a manner as to minimize a residual between the actual observed data and the calculated observation value using the batch least square estimation algorithm. Finally, when the convergence condition is satisfied by using a root mean square (RMS) calculated through iterative calculation, the iterative calculations are terminated, thereby precisely determining the orbit of the satellite.

Figure 3:
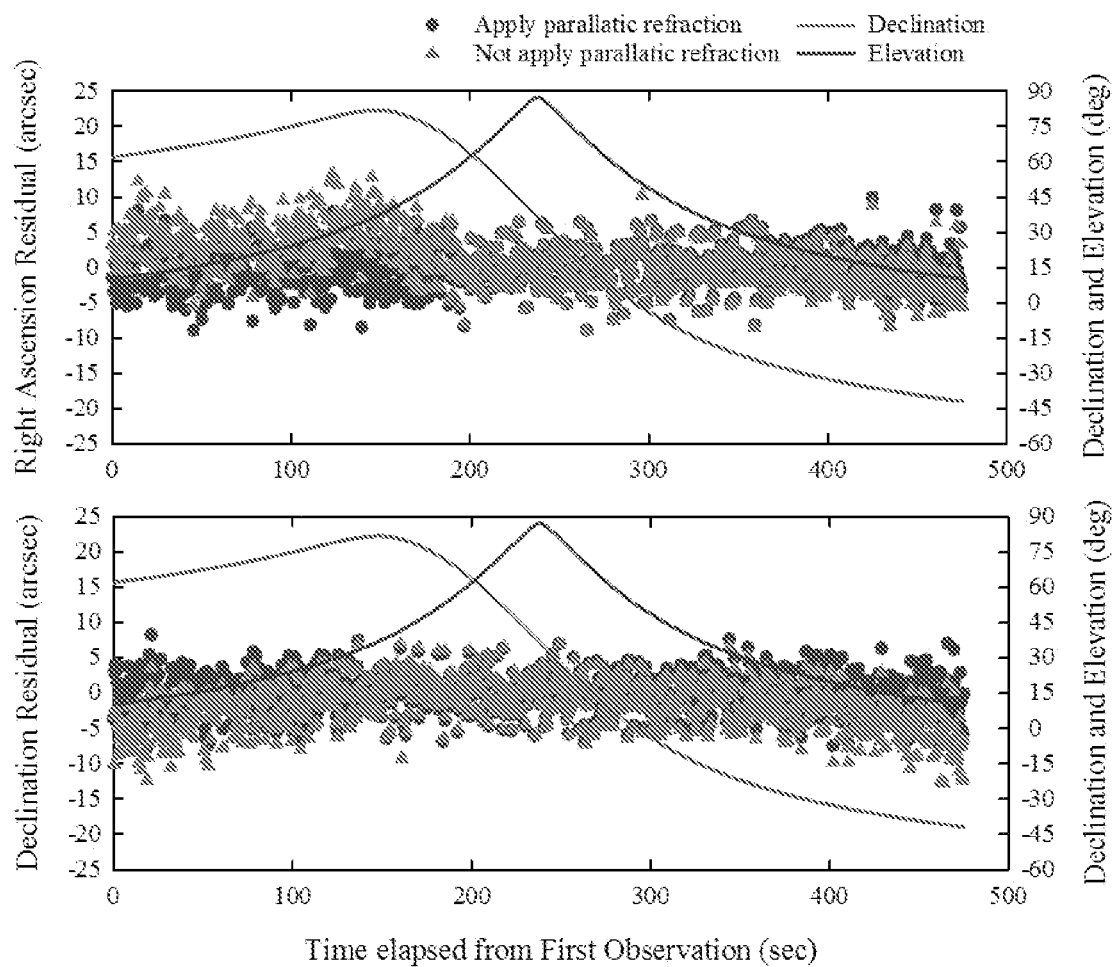
FIG. 3 is a graph showing observation residuals for parallactic refraction effect in determining an orbit of a satellite using actual satellite optical observation data according to an embodiment.

FIG. 3 is a graph showing observation residuals for parallactic refraction effect in determining an orbit of a satellite using actual satellite optical observation data according to an embodiment. Assuming that an observed noise of a satellite in a sun-synchronous orbit at an altitude of 550 km is 3 arcseconds (1σ) at a specific observation site (latitude of 36.1639 degrees, longitude of 128.9760 degrees, and height of 1139.2 m), FIG. 2 shows a case where the parallactic refraction is applied and a case where the parallactic refraction is not applied when observing one pass. Herein, the parallactic refraction scale factor having a value of one is applied. Circle shaped dots (or Blue dots) indicate cases where the parallactic refraction is applied to the orbit determination, and triangle shaped dots (or Red dots) indicate cases where the parallactic refraction is not applied. When the parallactic refraction is not applied to the observation modeling to determine the orbit, the residual in right ascension increases in a section with the highest declination value, and the residual in declination increases at altitudes less than or equal to 30 degrees. The case where the parallactic refraction is applied to the orbit determination shows a stable result.

Figure 4:
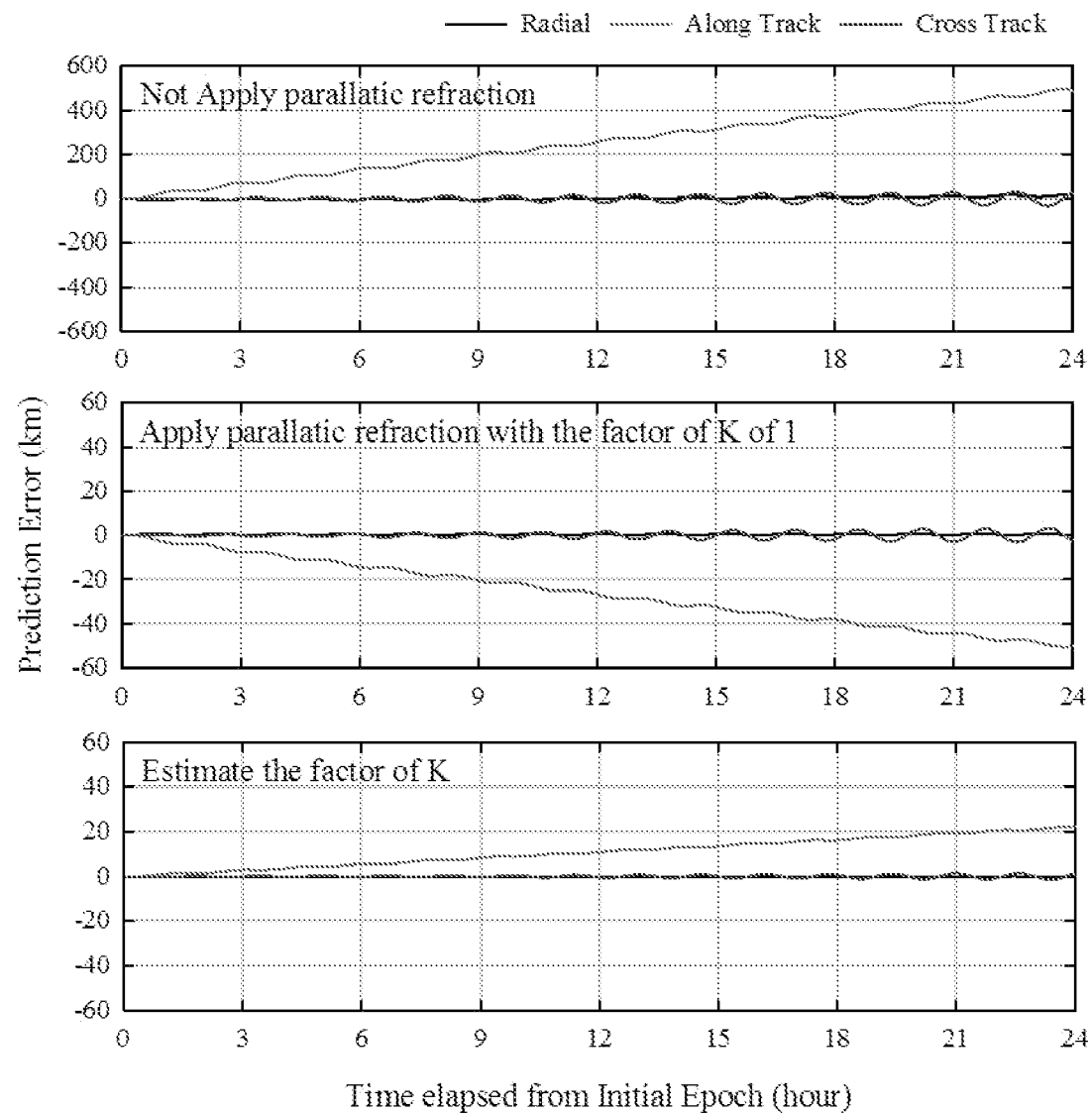
FIG. 4 is a graph showing a prediction error when orbit prediction is performed by using satellite precise orbit determination data which is determined using parallactic refraction scale factor estimation, according to an embodiment.

FIG. 4 is a graph showing a prediction error when orbit prediction is performed, using precise determination data of the satellite's orbit, determined through estimation of a parallactic refraction scale factor according to an embodiment, which describes the orbit prediction errors when the parallactic refraction scale factor is estimated simultaneously with the satellite position and velocity vector. FIG. 3 shows orbit prediction errors for 24 hours, when the parallactic refraction is not applied, when a constant value is applied without prediction, and when a parallactic refraction scale factor is estimated simultaneously with the satellite position and velocity vector, respectively, as a comparison result with the precision orbit prediction power (position error 20 cm (1σ)) of the KOMPSAT-5 satellite. When the parallactic refraction scale factor is estimated and applied to the orbit determination, the orbit prediction error is significantly reduced.

Although the embodiments have been described in detail above, the scope of the disclosure is not limited thereto, and various modifications and improvements performed by those skilled in the art using the basic concept of the disclosure defined in the following claims also belongs to the scope of the disclosure.

What is claimed is:

1. A tracking method for a satellite using a prediction system, the prediction system including a space surveillance network (SSN) radar, an optical wide-field patrol network (OWL-Net), and a server, wherein the server includes a communication interface, a storage medium, and a processor, the method comprising:
receiving, by the server through the communication interface, osculating orbital elements of a satellite transmitted from the OWL-Net or two-line elements (TLE) of the satellite from the SSN radar;
storing, by the server through the processor, the osculating orbital elements of the satellite or the TLE of the satellite in the storage medium in the server;
obtaining, by the server through the processor, an initial orbit information of the satellite with respect to an observation epoch from the osculating orbital elements or the two-line elements (TLE), and an initial value of a parallactic refraction scale factor;
performing, by a high-precision orbit propagator in the server, orbit propagation with respect to an observation epoch by applying a dynamics model;
performing, by the processor, observer-centered satellite optical observation modeling including the parallactic refraction scale factor to calculate estimated observation data;
obtaining, by the server through the communication interface, actual optical observation data from an actual optical observation device including the OWL-Net or the SSN radar;
calculating, by the processor in the server, an observation residual between the actual optical observation data and the estimated observation data calculated via the observation modeling reflecting a parallactic refraction;
obtaining, by the processor in the server, an estimated value of the parallactic refraction scale factor and an estimated satellite position and velocity using the observation residual and a batch least square estimation algorithm; and
tracking, by the processor in the server, an orbit of the satellite using the estimated value of the parallactic refraction scale factor and the estimated satellite position and velocity to control the satellite such that a risk of a collision between the satellite and space debris is minimized,
wherein the estimated observation data includes a right ascension ($\alpha$) and a declination ($\delta$), and the right ascension ($\alpha$) and the declination ($\delta$) are calculated according to Equation 1:

$$\alpha = \alpha_0 + \varepsilon_{Aaberr\_RA} + \varepsilon_{Daberr\_RA} + \Delta t \cdot \dot{\alpha} + K \cdot \Delta R \frac{\sin q}{\cos \delta_0}, \quad \text{[Equation 1]}$$

$$\delta = \delta_0 + \varepsilon_{Aaberr\_DEC} + \varepsilon_{Daberr\_DEC} + \Delta t \cdot \dot{\delta} + K \cdot \Delta R \cos q,$$

where, $\alpha_0$ and $\delta_0$ denote the right ascension and declination in the J2000 coordinate system, respectively; $\varepsilon_{Aaberr\_RA}$ and $\varepsilon_{Daberr\_RA}$ denote corrections of annual aberration and diurnal aberration for the right ascension, respectively; $\varepsilon_{Aaberr\_DES}$ and $\varepsilon_{Daberr\_DEC}$ denote corrections of annual aberration and diurnal aberration for the declination, respectively; $\Delta t$ denotes a time bias correction value; $\dot{\alpha}$ and $\dot{\delta}$ denotes a ratio of ascension to declination; $\Delta R$ denotes the parallactic refraction; q denotes a parallactic angle; and K denotes a value of the parallactic refraction scale factor.

2. The method of claim 1, wherein the initial orbit information of the satellite includes an epoch, position, and velocity.

3. The method of claim 2, wherein the initial value of the parallactic refraction scale factor is an initial ratio value of an arbitrary constant.

4. The method of claim 1, wherein the initial orbit information of the satellite is used as the osculating orbital element with the orbit being determined or a mean orbital element (two-line element (TLE)), in which the mean orbital element is used after conversion to the osculating orbital element.

5. The method of claim 1, wherein the applying of the dynamics model includes performing orbit integration by applying the high-precision orbit propagator in Cowell's method of numerical integration.

6. The method of claim 1, wherein the actual optical observation data in the calculating of the observation residual is observation data of the observer-centered right ascension and declination values of the satellite, which are extracted on the basis of an observation epoch and the right ascension and declination of a star in an image.

7. The method of claim 1, wherein the estimated parallactic refraction scale factor and the estimated satellite position and velocity are obtained simultaneously in such a manner as to minimize the observation residual between the actual observation data and the estimated observation data using the batch least square estimation algorithm, and terminating iterative calculations when a convergence condition is satisfied by using a root mean square calculated through the iterative calculations, thereby precisely determining the orbit of the satellite.

* * * * *